United States Patent [19]

Campbell

[11] 4,299,951

[45] Nov. 10, 1981

[54] TREATING SHAPED ARYLENE SULFIDE/SULFONE POLYMER WITH ORGANIC LIQUID AT ELEVATED TEMPERATURE

[75] Inventor: Robert W. Campbell, Bartlesville, Okla.

[73] Assignee: Phillips Petroleum Co., Bartlesville, Okla.

[21] Appl. No.: 116,435

[22] Filed: Jan. 29, 1980

[51] Int. Cl.³ .................. C08G 75/14; C08G 75/20
[52] U.S. Cl. .................................. 528/491; 528/388; 528/391; 528/495; 528/496; 528/497; 264/340; 264/345
[58] Field of Search ............. 528/491, 495, 496, 497, 528/388, 391; 264/340, 345

[56] References Cited

U.S. PATENT DOCUMENTS

| 3,155,756 | 11/1964 | Hechelhammer et al. | 264/178 |
| 3,200,182 | 8/1965 | Hechelhammer et al. | 264/235 |
| 3,562,199 | 2/1971 | Hill et al. | 260/37 R |
| 3,969,307 | 7/1976 | Osborn | 260/37 R |

Primary Examiner—Harold D. Anderson

[57] ABSTRACT

The tensile strength of shaped articles made from arylene sulfide/sulfone polymers is increased by treating the article with an organic liquid at an elevated temperature. In one embodiment, the organic liquid comprises at least one of selected hydrocarbons, alcohols, and esters.

11 Claims, No Drawings

TREATING SHAPED ARYLENE SULFIDE/SULFONE POLYMER WITH ORGANIC LIQUID AT ELEVATED TEMPERATURE

This invention relates to the heat treatment of polymers to improve the physical properties of the polymer. In another aspect, this invention relates to a process of heat treating shaped polymers to improve the physical properties thereof. In another aspect, this invention relates to heat treatment of poly(arylene sulfide/sulfone) in organic liquids under conditions which improve the physical properties, particularly the tensile strength of the polymer. In accordance with a further aspect, this invention relates to a process of heat treating arylene sulfide/sulfone polymers by immersion in an organic liquid at an elevated temperature which is below the melting point of the polymer for a period of time sufficient to improve the tensile strength of shaped articles formed from the polymer.

It is well known in the art that some solid materials, such as thermoplastics, which are capable of attaining some degree of crystallinity will, upon annealing, exhibit some increase in strength. It is currently theorized that such increased strength is a result of an increased degree of crystallinity resulting from the annealing process. Significant improvements in strength in amorphous polymers have not been observed by subjecting these thermoplastic materials substantially devoid of any measurable crystallinity to normal annealing or heat treatment processes.

Aromatic sulfide/sulfone polymers, while known in the art to be thermoplastic in nature and useful in such areas as electrical components, wire coatings, automotive parts, etc., are also known to be amorphous, that is, substantially devoid of measurable crystallinity. Thus, the observation that tensile strength of aromatic sulfide/sulfone polymers is significantly increased by heat treatment in the presence of certain organic liquids is quite unexpected.

This invention pertains to a process of increasing the tensile strength of aromatic sulfide/sulfone polymers by treatment of molded objects thereof at elevated temperatures in the presence of organic liquids.

Accordingly, it is an object of this invention to provide a shaped, solid polymer of an aromatic compound having improved physical properties.

It is another object of this invention to provide a process of heat treating shaped, solid polymers without causing extreme chemical changes leading to a much different polymer.

Still another object of this invention is to provide a shaped, solid polymer having improved structural characteristics in a simple, economic, and expedient way.

Another object of this invention is to produce a molded polymer having desirable physical properties.

Other aspects, objects, and the several advantages of this invention are apparent from a study of the disclosure and the appended claims.

According to the invention, there is provided a process of improving the physical properties of shaped, solid arylene sulfide/sulfone polymers comprising heat treating said polymers in an organic liquid at an elevated temperature below the melting point of the polymer and for a period of time sufficient to improve the tensile strength, in particular, of the shaped polymer.

More specifically in accordance with the invention, a process is provided for heat treating arylene sulfide/sulfone polymers as molded objects in an organic liquid comprising at least one of a hydrocarbon, an alcohol, and an ester at an elevated temperature below the melting point of the polymer and for a period of time sufficient to improve the tensile strength of the molded object.

The aromatic sulfide/sulfone polymers which can be beneficially treated according to the teaching of this invention are any of those well known in the art. For example, U.S. Pat. Nos. 4,016,145; 4,125,525; and 4,127,713 disclose the production of aromatic sulfide/sulfone polymers which when treated according to the process of this invention will exhibit increased tensile strength. The above-noted patents are hereby incorporated by reference.

It is also within the scope of this invention to treat aromatic sulfide/sulfone polymers prepared by addition of alkyl halide or additional dihaloaromatic sulfone at or near completion of polymerization as disclosed and claimed in my copending application having Ser. No. 116,434 filed Jan. 29, 1980.

Organic liquids suitable for use as treating agents in the present invention include saturated aliphatic and saturated cycloaliphatic hydrocarbons, saturated aliphatic and saturated cycloaliphatic alcohols, and saturated aliphatic or saturated cycloaliphatic esters of saturated aliphatic or saturated cycloaliphatic carboxylic acids.

Saturated aliphatic and cycloaliphatic hydrocarbons useful as treating agents for aromatic sulfide/sulfone polymers include alkanes, cycloalkanes, and alkyl-substituted cycloalkanes generally containing from 5 to about 20 carbon atoms per molecule with those containing from 6 to about 10 carbon atoms per molecule being preferred. Examples of such suitable hydrocarbons include pentane, hexane, decane, 2,2,4-trimethylhexane, cyclopentane, cyclohexane, cycloheptane, cyclooctane, cyclododecane, methylcyclohexane, ethylcyclooctane, 2,5,9-trimethylcyclododecane, 2,6,10-triethylcyclotetradecane, and the like, and mixtures thereof.

Alcohols which are useful in the treatment of aromatic sulfide/sulfone polymers to increase the tensile strength thereof include those alkanols and cycloalkanols generally containing from 1 to about 20 carbon atoms per molecule. It is generally preferred to employ alkanols containing from 3 to 6 carbon atoms per molecule. Examples of suitable alcohols include methanol, ethanol, n-propanol, isopropanol, n-butanol, t-butanol, n-pentanol, 2-methyl-1-butanol, n-hexanol, 2-ethyl-1-hexanol, n-decanol, n-dodecanol, n-tetradecanol, 2,4,8-triethyl-1-tetradecanol, cyclopentanol, cyclohexanol, cyclooctanol, cyclododecanol, 2-methylcyclohexanol, 3-ethylcyclooctanol, 2,4,6-trimethylcyclohexanol, and the like, and mixtures thereof.

Carboxylic acid esters which are useful in the practice of this invention include alkyl and cycloalkyl esters of alkyl and cycloalkyl carboxylic acids generally containing from 2 to about 20 carbon atoms per molecule. Examples of suitable carboxylic esters include methyl formate, ethyl formate, ethyl acetate, methyl propionate, isobutyl isobutyrate, amyl acetate, isopropyl n-hexanoate, 2-ethyl-1-hexyl dodecanoate, cyclohexyl acetate, methyl cyclohexyl carboxylate, and the like, and mixtures thereof.

Treatment conditions for use in this invention include immersion of the molded aromatic sulfide/sulfone polymer object in a suitable organic liquid for a period of from about 30 minutes to about 72 hours, and preferably about 10 hours to about 40 hours at a temperature of from about 50° to about 200° C. and preferably about 75° to about 150° C. with the further provisos that the temperature selected be at least about 20° C. below the melting point of the polymer and that the organic compound selected as treating agent actually exist in liquid phase at the desired temperature. Thus, if it is necessary to employ positive pressure on the organic treating agent to maintain it in liquid state at the desired temperature, then such is within the scope of this invention, though it is not currently believed that increased pressure, per se, during the treatment has any effect on the tensile strength.

Following the inventive treatment of molded aromatic sulfide/sulfone polymer objects, the objects are removed from the treating agent and are dried by any convenient method, such as evaporation of treating agent or by washing the treating agent from the molded object with a suitable volatile non-solvent, followed by evaporation of same from the molded object. It is generally preferable to rinse the treating agent from the surface of the molded object with a suitable non-solvent, e.g., water, and to then dry the object prior to testing.

The molded aromatic sulfide/sulfone polymer objects which are treated by means of this invention can be obtained by any of the well known molding procedures of the art. Injection molding, compression molding, or even spinning into fibers can be employed to prepare the objects suitable for inventive treatment.

Though I do not wish to be bound by theory, it appears that by analogy to the annealing of crystalline materials, some form of molecular orientation or reordering other than crystallization occurs during the treatment according to this invention, thus resulting in increased tensile strength of the treated objects.

EXAMPLE I

Poly(phenylene sulfide/sulfone) objects were prepared for use in the present invention according to the following procedure.

The polymer (A) for run 1 was prepared by mixing in a 7.5 liter reactor sodium sulfide (5.0 mol), sodium hydroxide (0.135 mol), lithium acetate (5.0 mol), bis(4-chlorophenyl)-sulfone (5.025–5.05 mol), N-methyl-2-pyrrolidone (20 mol). After heating with stirring for 2.0–2.5 hours at 200° C. (1000–1050 kPa), the temperature was lowered to 150° C. for the addition of methyl chloride (2 mol) dissolved in N-methyl-2-pyrrolidone (500 g). After continued heating at 150° C. for 50–55 minutes, the reactor was cooled and the reaction mixture was washed several times with hot water and hot acetone. The recovered polymer was dried at reduced pressure at 80° C. under nitrogen atmosphere.

The polymer (B) for runs 2, 3, and 4, was prepared by mixing in a 7.5 liter reactor sodium sulfide (6.0 mol), sodium hydroxide (0.067 mol), lithium acetate (6.0 mol), bis(4-chlorophenyl)sulfone (6.0 mol) and N-methyl-2-pyrrolidone (24 mol). After heating with stirring for 5 hours at 200° C. (790–920 kPa), bis(4-chlorophenyl)sulfone (0.3 mol) in N-methyl-2-pyrrolidone (600 g) was added. The reaction mixture was maintained at 200° C. for 30 minutes after which the reactor was cooled and the reaction mixture was washed several times with hot water and hot acetone. The recovered polymer was dried at 80° C. at reduced pressure under nitrogen atmosphere.

In run 1, polymer A described above was injection molded into the form of conventional tensile bars (with the narrow portion being 3.2 mm × 13 mm × 57 mm) employing a barrel temperature of 343° C., a mold temperature of 177° C., and a holding time in the mold of 30 seconds.

In run 2, polymer B described above was injection molded into the form of conventional tensile bars (as described above) employing a barrel temperature of 343° C., a mold temperature of 177°–189° C., and a holding time in the mold of 25 seconds.

In runs 3 and 4, polymer B was extruded into 3.2 mm diameter strands which were then chopped prior to injection molding into the form of conventional tensile bars (as described above) employing a barrel temperature of 343° C., a mold temperature of 177° C., and a holding time in the mold of 30 seconds (run 3) and 35 seconds (run 4).

EXAMPLE II

The following inventive and comparative runs were conducted by immersing the molded bars prepared in Example I in various liquids and allowing them to remain immersed in these liquids for 24 hours at 93.3° C. After such treatment, the bars were rinsed with water and dried. In control runs 5, 10, 16 and 22, the polymers were not subjected to either elevated temperatures or liquid treatment. Tensile values were determined according to ASTM D638-60T. The resultant tensile strengths are recorded in Table I.

TABLE I

| Run No. | Object From Run No. | Treating Agent | Tensile, Maximum psi | Increase, %[a] | Description |
|---|---|---|---|---|---|
| 5 (cont) | 1 | None | 13580[b] | | |
| 6 (comp) | 1 | Glacial Acetic Acid | 13920[c] | +2.5 | |
| 7 (comp) | 1 | 37% Aqueous HCl | 12180[c] | −10.3 | Slight bleach |
| 8 (comp) | 1 | 30% Aqueous NaOH | 13900[c] | +2.3 | |
| 9 (comp) | 1 | n-Butylamine | 13000[c] | −4.3 | Slight bleach |
| 10 (cont) | 2 | None | 14710[b] | | |
| 11 (comp) | 2 | Pyridine | 2860[c] | −80.6 | Nearly destroyed |
| 12 (inv) | 2 | Cyclohexane | 16440[b] | +11.8 | |
| 13 (comp) | 2 | Toluene | 14840[c] | +0.9 | Slight bleach |
| 14 (inv) | 2 | Ethyl Acetate | 17090[c] | +16.2 | |
| 15 (comp) | 2 | Chlorobenzene | 5960[c] | −59.5 | Bleached, crazing |
| 16 (cont) | 3 | None | 14560[c] | | |
| 17 (comp) | 3 | Methyl ethyl ketone | 6620[c] | −54.5 | Some bleaching |
| 18 (comp) | 3 | m-Cresol | | | Dissolved |
| 19 (inv) | 3 | n-Butanol | 18940[b] | +30.1 | |
| 20 (comp) | 3 | 2-Ethoxyethanol | 11960[c] | −17.9 | Slight bleach |
| 21 (comp) | 3 | Tetrahydrofuran | 5580[c] | −61.7 | Bleached |
| 22 (cont) | 4 | None | 14710[b] | | |

TABLE I-continued

| Run No. | Object From Run No. | Treating Agent | Tensile, Maximum psi | Increase, %[a] | Description |
|---|---|---|---|---|---|
| 23 (comp) | 4 | Water | 14210[b] | −3.4 | |
| 24 (comp) | 4 | 10% Aqueous FeCl$_3$ | 14650[b] | −0.4 | |

[a] Percent increase in maximum tensile compared to appropriate control run.
[b] Maximum tensile strength at yield point.
[c] Maximum tensile strength at break point. No yield point observed.

From the data given in Table I, it will be observed that among those liquids testing as treating agents only cyclohexane (run 12), ethyl acetate (run 14) and n-butanol (run 19) showed significant increase of tensile strength compared to untreated polymer. Other liquids (comparative runs) caused either little effect or detrimental effect on the tensile strength of the treated polymers.

I claim:

1. A process for increasing the tensile strength of a shaped arylene sulfide/sulfone polymer which comprises contacting the shaped article with an organic liquid comprising at least one of:
   (a) saturated aliphatic and saturated cycloaliphatic hydrocarbons;
   (b) saturated aliphatic and saturated cycloaliphatic alcohols; and
   (c) saturated aliphatic and saturated cycloaliphatic esters of saturated aliphatic and saturated cycloaliphatic carboxylic acids at an elevated temperature which is below the melting point of the polymer for a period of time sufficient to increase the tensile strength of the shaped article.

2. A process according to claim 1 wherein said organic liquid comprises at least one of
   (a) cycloaliphatic hydrocarbon;
   (b) saturated aliphatic alcohol; and
   (c) saturated aliphatic ester or saturated aliphatic acid.

3. A process according to claim 2 wherein
   (a) is cyclohexane;
   (b) is n-butanol; and
   (c) is ethyl acetate.

4. A process according to claim 1 wherein the shaped article is heated at an elevated temperature which is at least 20° C. below the melting point of the polymer and the organic liquid is in the liquid phase at the elevated temperature.

5. A process according to claim 2 wherein said elevated temperature ranges from about 50° C. to about 200° C. and said period of time ranges from about 30 minutes to about 72 hours.

6. A process according to claim 1 wherein said shaped article is molded from said polymer.

7. A process according to claim 1 wherein said shaped article is immersed in the organic liquid, maintained under liquid phase conditions at a temperature ranging from about 75° C. to about 150° C., and which is at least 20° C. below the melting point of the polymer for a period of time ranging from about 10 to about 40 hours.

8. A process according to claim 7 wherein the shaped article after being treated for a sufficient period of time to increase the tensile strength is removed from the treatment and allowed to dry.

9. A process according to claim 8 wherein the shaped article is removed from the treating liquid and subjected to further treatment to remove treating organic liquid prior to drying.

10. A process according to claim 9 wherein the shaped article is rinsed with water to remove organic liquid prior to drying.

11. A process according to claim 10 wherein the organic liquid is cyclohexane, n-butanol, or ethyl acetate.

* * * * *